United States Patent
Jordan et al.

(10) Patent No.: US 9,747,510 B2
(45) Date of Patent: *Aug. 29, 2017

(54) TECHNIQUES FOR ROTATING LANGUAGE PREFERRED ORIENTATION ON A MOBILE DEVICE

(71) Applicant: International Business Machines Corporation, Armonk, NY (US)

(72) Inventors: Adrian B. Jordan, Morrisville, NC (US); Joseph N. Kozhaya, Morrisville, NC (US); Michael T. Peters, Morrisville, NC (US); David S. Richardson, Morrisville, NC (US); Teppei Tsurumi, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,744

(22) Filed: Nov. 4, 2015

(65) Prior Publication Data
US 2016/0260194 A1    Sep. 8, 2016

Related U.S. Application Data

(63) Continuation of application No. 14/639,728, filed on Mar. 5, 2015.

(51) Int. Cl.
*G06F 3/048* (2013.01)
*G06K 9/32* (2006.01)
(Continued)

(52) U.S. Cl.
CPC ......... *G06K 9/3208* (2013.01); *G06F 1/1626* (2013.01); *G06F 3/0485* (2013.01);
(Continued)

(58) Field of Classification Search
None
See application file for complete search history.

(56) References Cited

U.S. PATENT DOCUMENTS

2007/0168883 A1* 7/2007 Sugimoto ............. G06F 1/1616
715/818
2007/0283255 A1* 12/2007 Kina ................. G06F 17/30719
715/264
(Continued)

FOREIGN PATENT DOCUMENTS

JP  2004102455 A  4/2004
JP  2010204729 A  9/2010
(Continued)

OTHER PUBLICATIONS

Anonymously; "Template-Based Development on Mobile Platforms"; An IP.com Prior Art Database Technical Disclosure; http://ip.com/IPCOM/000234925; Feb. 16, 2014.
(Continued)

*Primary Examiner* — Benjamin C Lee
*Assistant Examiner* — David Lee
(74) *Attorney, Agent, or Firm* — Patterson + Sheridan, LLP

(57) ABSTRACT

Techniques presented herein describe rotating text content rendered on a mobile device to a preferred orientation based on the mobile device orientation and language of the text content. A display tool executing on the mobile device detects an orientation of the mobile device changing from a first orientation to a second orientation. The mobile device currently displays the characters in the text content according to the first orientation. The display tool determines that the text content is written in a specified language. The
(Continued)

display tool re-renders the display of the characters in the text content and any accompanying images according to the second orientation.

20 Claims, 5 Drawing Sheets

(51) Int. Cl.
*G06F 1/16* (2006.01)
*G09G 5/00* (2006.01)
*G06F 3/0485* (2013.01)
*G06T 3/00* (2006.01)
*G06T 11/60* (2006.01)

(52) U.S. Cl.
CPC ............ *G06T 3/0006* (2013.01); *G06T 11/60* (2013.01); *G09G 5/00* (2013.01); *G09G 5/005* (2013.01); *G06F 2200/1614* (2013.01); *G06K 2209/011* (2013.01); *G09G 2340/0492* (2013.01); *G09G 2340/14* (2013.01); *G09G 2354/00* (2013.01); *G09G 2370/22* (2013.01)

(56) References Cited

U.S. PATENT DOCUMENTS

| | | | | |
|---|---|---|---|---|
| 2009/0307578 | A1* | 12/2009 | Wei | G06F 17/2223 715/227 |
| 2010/0088532 | A1* | 4/2010 | Pollock | G06F 1/1626 713/324 |
| 2010/0088591 | A1* | 4/2010 | Ho | G06Q 30/02 715/247 |
| 2010/0275152 | A1* | 10/2010 | Atkins | G06F 17/212 715/788 |
| 2012/0185788 | A1 | 7/2012 | Fong et al. | |
| 2013/0339907 | A1* | 12/2013 | Matas | G06T 11/60 715/853 |
| 2013/0346274 | A1* | 12/2013 | Ferdinand | G06Q 40/04 705/37 |
| 2014/0035823 | A1* | 2/2014 | Khoe | G06F 3/02 345/171 |
| 2014/0049563 | A1* | 2/2014 | Tobin | G06F 3/012 345/649 |
| 2014/0240360 | A1 | 8/2014 | Song et al. | |
| 2014/0257789 | A1* | 9/2014 | Zaric | G06K 9/00463 704/8 |
| 2014/0258870 | A1 | 9/2014 | Gordon | |
| 2014/0337151 | A1* | 11/2014 | Crutchfield | G06F 1/1601 705/17 |
| 2015/0046856 | A1* | 2/2015 | Rucker | G06F 3/0488 715/765 |

FOREIGN PATENT DOCUMENTS

| | | |
|---|---|---|
| KR | 20060030771 A | 4/2006 |
| WO | 2012118332 A2 | 9/2012 |
| WO | 2014164403 A1 | 10/2014 |

OTHER PUBLICATIONS

Motorola et al.; "A Geodetic Model for Markerless Positioning of Virtual Content in Mobile Augmented Reality Systems"; An IP.com Prior Art Database Technical Disclosure; http://ip.com/IPCOM/000173683; Aug. 20, 2008.

U.S. Appl. No. 14/639,728, Entitled "Techniques for Rotating Language Preferred Orientation on a Mobile Device", Filed Mar. 5, 2015.

IBM "List of IBM Patents or Patent Applications Treated as Related".

* cited by examiner

TECHNIQUES FOR ROTATING LANGUAGE PREFERRED ORIENTATION ON A MOBILE DEVICE

CROSS-REFERENCE TO RELATED APPLICATIONS

This application is a continuation of co-pending U.S. patent application Ser. No. 14/639,728, filed Mar. 5, 2015. The aforementioned related patent application is herein incorporated by reference in its entirety.

BACKGROUND

Embodiments presented herein generally relate to text display on mobile devices. And more specifically, to techniques for rotating text rendered on the mobile device relative to the orientation of the device.

Mobile devices (e.g., smartphones, tablets, and e-readers) provide convenience to users. For instance, a smartphone can execute a number of applications, such as web browsers, news readers, and games. Further, the portability of smartphones allows individuals to use applications from virtually anywhere. The number of smartphones has dramatically increased worldwide, including in East Asian countries, such as China, Japan, and South Korea.

Traditionally, in East Asian countries, script in paper materials (e.g., newspapers, novels, comic books) is written vertically in columns going from top to bottom and ordered from right to left. East Asian characters, such as Chinese hanzi, Japanese kana, and Korean Hangul, facilitate such a vertical orientation due to stroke order and direction in writing each character. Although East Asian characters may also be oriented horizontally, many individuals in East Asian countries are accustomed to vertical script. Indeed, newspapers and books in East Asian countries continue to be printed in a vertical text orientation. However, in contrast, websites (even those originating from East Asian countries) generally display script in a horizontal text orientation, i.e., written in rows going from left to right and ordered from top to bottom.

SUMMARY

One embodiment presented herein describes a method for modifying an orientation of text content having characters rendered on a mobile device. The method generally includes detecting an orientation of the mobile device changing from a first orientation to a second orientation. The mobile device currently displays the characters in the text content according to the first orientation. The method also includes determining that the text content is written in a specified language. The display of the characters in the text content is re-rendered according to the second orientation.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
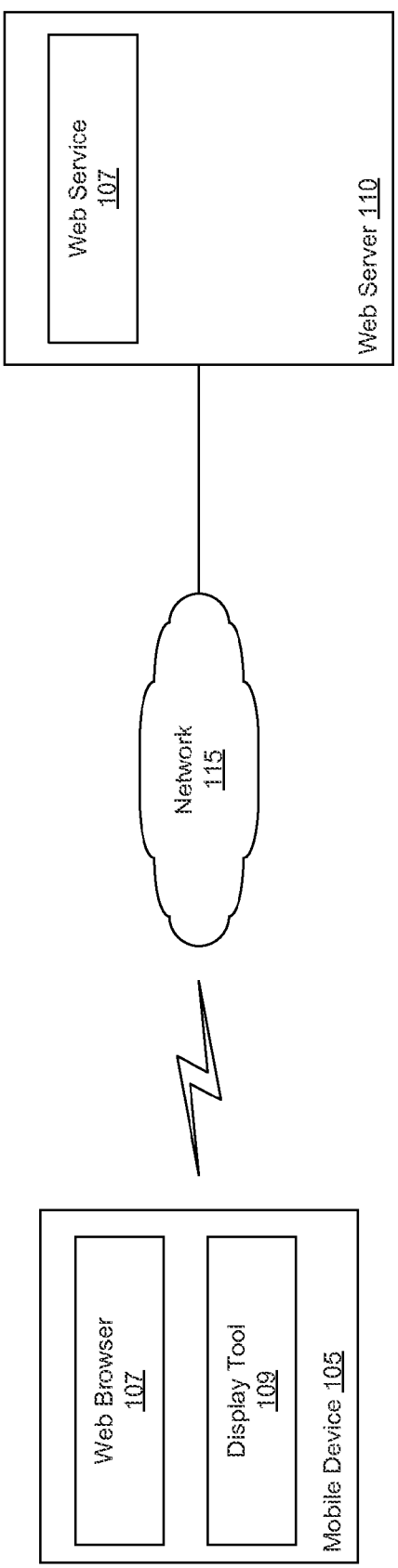
FIG. 1 illustrates an example computing environment, according to one embodiment.

Traditionally, in East Asian countries, script in paper materials (e.g., newspapers, novels, comic books) are often printed with a vertical text orientation, i.e., in columns going from top to bottom and ordered from right to left. In contrast, mobile applications (e.g., web browsers, news readers, messaging applications, etc.) often display script in a horizontal text orientation, i.e., written in rows going from left to right and ordered from top to bottom. Although East Asian characters may be oriented horizontally, many individuals in East Asian countries are accustomed to vertical script and may prefer to read script in a vertical text orientation.

One approach for displaying East Asian text on a mobile device allows a user to select an option on the mobile device to rotate horizontally-oriented text to a vertical text orientation. In particular, the mobile device organizes lines of text into separate blocks and rotates the blocks to display the text vertically. Further, the mobile device places each successive block under each prior block, such that a user scrolls up and down through each block to read the text. Such a layout may be unnatural to an East Asian user accustomed to reading from right to left through the entire text.

Embodiments presented herein describe techniques for changing the orientation of text rendered on a mobile device based on language preferences and mobile device orientation. In one embodiment, a mobile device (e.g., a smartphone, a tablet, an e-reader, etc.) provides a display tool. A user may configure the display tool to present content provided by an application (e.g., a web browser, news reader, messaging application, etc.) in a vertical text orientation consistent with printed East Asian script. The user may specify which languages to present in the vertical text orientation.

When enabled, the user may hold the mobile device in a specified orientation, such as in a landscape orientation, to view content of a given application. In turn, the display tool detects a change in orientation. The display tool may then determine whether the current orientation corresponds to the landscape orientation. Further, the display tool may also detect that the text content is in a specified language, such as in Japanese. After detecting both the change in orientation and that the text content is in the specified language, the display tool may then lock the display. Thereafter, the display tool rotates the text such that the text is readable in columns going from top to bottom and ordered from right to left. Further, because the display tool locks the display in portrait orientation, if the display provides a scrolling element, the user may scroll horizontally, i.e., from right to left.

The display tool rotates East Asian characters presented on a mobile device to be consistent with East Asian vertical script. Advantageously, doing so provides readers of East Asian languages with a more intuitive and natural viewing experience on the mobile device, at least in the one orientation. Further, the display tool facilitates navigating through the rotated text content by providing horizontal scrolling.

Note, the following references a web browser on a mobile device as an example of an application rotating text rendered on the mobile device based on a device orientation and a language identified in the text content. However, one of skill in the art will recognize that embodiments may be adapted to a variety of mobile applications, such as news readers, e-mail clients, messaging applications, and the like. Further, the display tool may be incorporated into the mobile application itself, as a component of the mobile device operating system, or as a standalone application executing on the mobile device. Further note, the following references a smartphone as an example of a mobile device having a display tool that rotates a text orientation to an orientation consistent with East Asian vertical script. However, embodiments may also be adapted to a various mobile devices, such as e-readers, tablets, handheld video game systems, and other computing devices capable of determining an orientation of the device.

FIG. 1 illustrates an example computing environment 100, according to one embodiment. As shown, computing environment 100 includes a mobile device 105 and a web server 110. In this example, the mobile device 105 represents a smartphone having a touch-sensitive display. The mobile device 105 accesses a web service 107 wirelessly over a network 115 through a web browser 107. The web service 107 may provide a variety of web content to a user. The web browser 107 renders the web content for display on the mobile device 105.

Text in the web content may include various kinds of encoded characters, such as East Asian characters (e.g., Chinese hanji, Japanese kana, Korean Hangul, etc.). Further, each character may be encoded as part of a universal character set, where each character is encoded in multiple bytes. The web browser 107 renders the encoded characters for display. Generally, the displayed text is consistent with a horizontal text orientation, i.e., in rows going from left-to-right and ordered from top-to-bottom, even if the web page content is primarily written in an East Asian language. Although East Asian languages can be displayed in the horizontal text orientation, in some cases, a user may desire to view the East Asian text content in a vertical text orientation, i.e., in columns going from top-to-bottom and ordered from right-to-left.

In one embodiment, the mobile device 105 includes a display tool 109. The display tool 109 rotates web page content to a desired layout based on the orientation of the mobile device 105 and whether the content is in a specified language. The display tool 109 allows a user to configure language settings such that web pages written in an East Asian language are presented in an orientation consistent with East Asian vertical script.

In one embodiment, when the user enables the display tool 109, the display tool 109 may execute an event listener that monitors (e.g., through the mobile operating system) orientation of the mobile device 105. Further, the display tool 109 may determine whether the device is positioned in a specified orientation, such as landscape. Further, the display tool 109 may detect whether text includes content of a specified language (e.g., Chinese, Japanese, Korean, etc.). The display tool 109 rotates the text content displayed by the mobile device 105 to the desired orientation after detecting the specified device orientation and that the text includes content of a specified language.

For example, assume a user desires to view a news website on the web browser 107 with text content in Japanese, and that the display tool 109 is enabled to rotate text for Japanese language content. Further, assume that the user is holding the mobile device 105 in a portrait orientation. In portrait orientation, the web browser 107 may display the web content, including the Japanese language text, in standard horizontal orientation. That is, the web browser renders the content using conventional rendering techniques. In contrast, assume that the user rotates the device to a landscape orientation. In response, the display tool 109 detects the change to landscape orientation. The display tool 109, also detecting that the web content includes Japanese language text, may rotate the text to be consistent with an East Asian vertical orientation.

Figure 2:
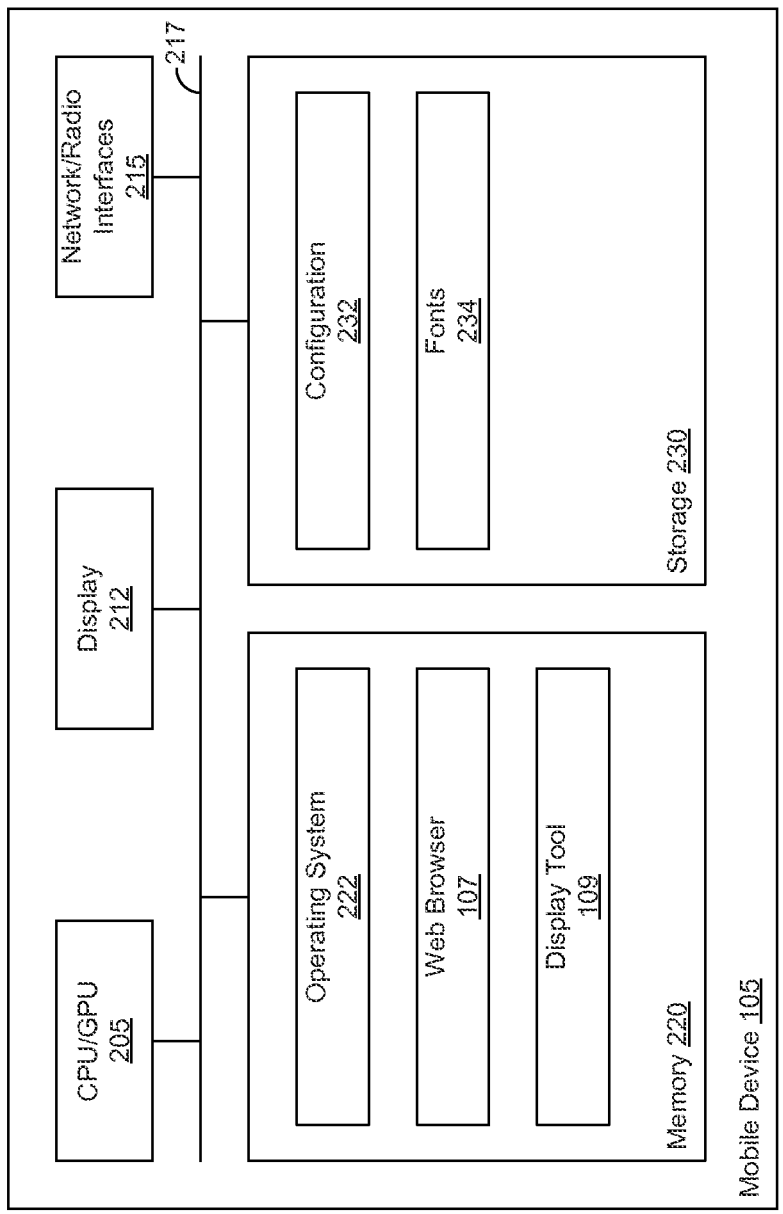
FIG. 2 further illustrates the mobile device described relative to FIG. 1, according to one embodiment.

FIG. 2 further illustrates the mobile device 105, according to one embodiment. As shown, the mobile device 105 includes, without limitation, a central processing unit and graphics processing unit (CPU/GPU) 205, a display 212, network/radio interfaces 215, an interconnect 217, a memory 220, and a storage 230. Of course, an actual mobile device will include a variety of additional hardware components.

The CPU/GPU 205 retrieves and executes programming instructions stored in the memory 230. Similarly, the CPU/GPU 205 stores and retrieves application data residing in the memory 230. The interconnect 217 is used to transmit instructions and data between the CPU/GPU 205, storage 230, network interfaces 215, and memory 220. CPU/GPU 205 is included to be representative of a single CPU, multiple CPUs, a single CPU having multiple processing cores, and the like. And the memory 220 is generally included to be representative of memory and storage on a mobile device, e.g., DDR and flash memory spaces.

Illustratively, the memory 220 includes an operating system 222, the web browser 107, and the display tool 109. And the storage 230 includes a configuration 232 and fonts 234. The operating system 222 provides software configured to control the execution of application programs on the mobile device 105. Further, the operating system 222 can report event data indicating changes to orientation of the mobile device 105 with relation to the pull of gravity (e.g., through an accelerometer configured in the device 105).

The web browser 107 renders web content on the mobile device 105 (via display 212). The display tool 109 rotates the content to a layout, e.g., in a vertical orientation that is consistent East Asian script, based on the orientation of the device and specified language settings. The display tool 109 may execute event listeners that receive messages from the operating system 222 indicating a change in orientation of the mobile device 105. The display tool 109 may also detect whether current text displayed by the mobile device 105 includes content in a language specified in the configuration 232, e.g., whether a content language field of an HTTP header matches the language, whether text content is formatted in an East Asian font 232, or through natural language detection techniques. If so, then the display tool 109 rotates the text and other displayed content (e.g., images, embedded videos, etc.) to the desired orientation.

Figure 3:
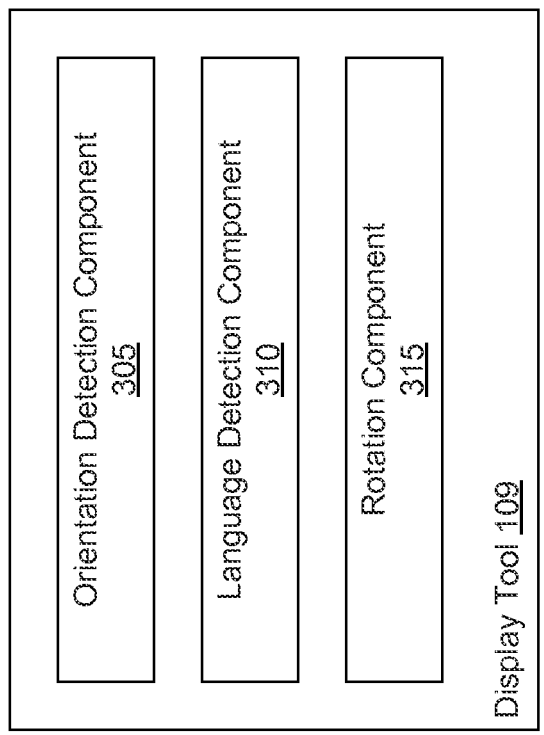
FIG. 3 further illustrates the display tool described relative to FIG. 1, according to one embodiment.

FIG. 3 further illustrates the display tool 109, according to one embodiment. As shown, the display tool includes an orientation detection component 305, a language detection component 310, and a rotation component 315. In one embodiment, the orientation detection component 305 may monitor operating system activity, e.g., through an event listener, to determine a current orientation of the mobile device 105. Doing so allows the orientation detection component 305 to identify changes in orientation of the mobile device. For example, if a user rotates the mobile device 105 from one orientation to another, the operating system may report event data regarding the change in orientation. The event listener may send such events to the detection component 305. Further, the event listener may report changes in orientation to the orientation detection component 305. The orientation detection component 305 notifies the rotation component 315 of changes in orientation.

In one embodiment, the language detection component 305 may evaluate text content currently being displayed to the user for a specified language. To do so, the language detection component 310 may use any suitable natural language detection techniques to identify which language the text content is primarily written in. In addition, the language detection component 310 may also identify the specified language based on whether the text content is formatted in a font of the specified language, or whether an HTTP header includes a value for a content language field. The language detection component 310 may notify the rotation component 315 if the identified language matches a specified language to be detected.

In one embodiment, the rotation component 315 receives notifications from the orientation detection component 305 of changes to a specified orientation in the mobile device 105. Further, the rotation component 315 receives notifications from the language detection component 310 of currently displayed text content being of a specified language. In response to receiving both notifications, the rotation component 315 may rotate the text and other displayed content (e.g., images) to a specified orientation, e.g., a vertical orientation consistent with East Asian script. For example, to do so, the rotation component 315 may lock the display in the current orientation. Once locked, the rotation component 315 rotates the text through substantially ninety degrees, e.g., the rotation component 315 may rotate the text anywhere between eighty-five and ninety-five degrees. Doing so results in the text content being organized in columns going from top-to-bottom and ordered from right-to-left. Further, if a scroller is provided to navigate through the text content, the rotation component 315, by locking the display, may allow the scroller to navigate from right to left. As a result, a user may read East Asian text displayed on a mobile device 105 in a vertical orientation.

Figure 4B:
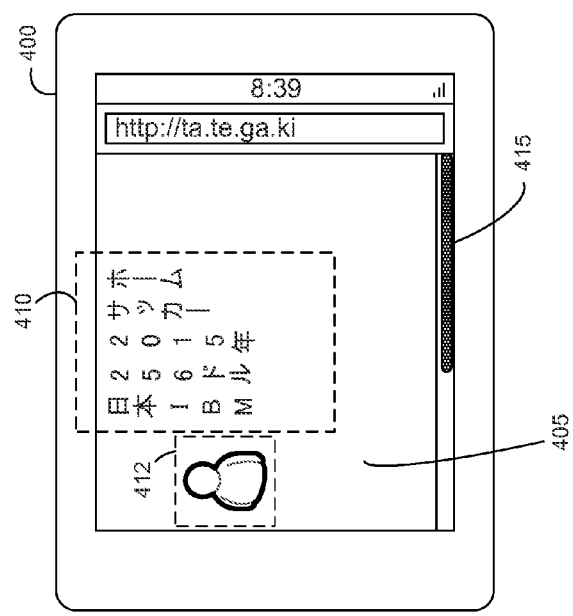
FIGS. 4A and 4B illustrate an example of rotating text rendered on a mobile device display based on an orientation of the mobile device, according to one embodiment.
Figure 4A:
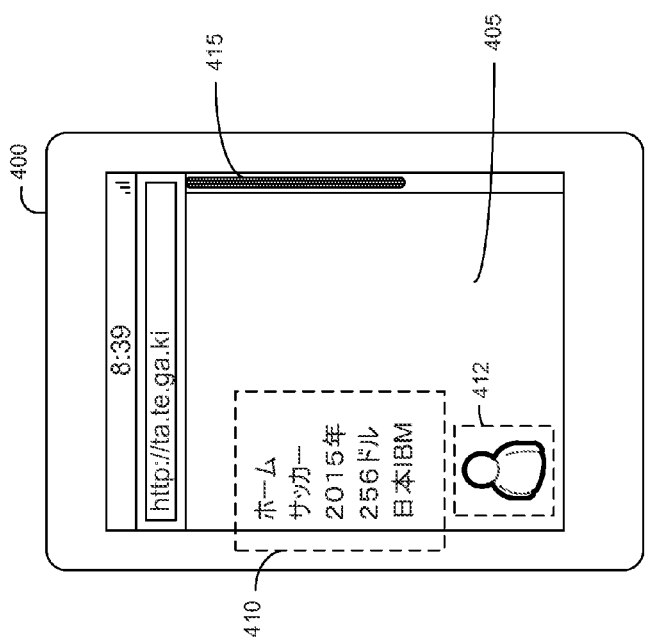

FIGS. 4A and 4B illustrate an example of text rendered on a mobile device display based on an orientation of a mobile device 400, according to one embodiment. FIG. 4A illustrates the mobile device 400 in a portrait orientation. Illustratively, a web browser executing on the mobile device 400 renders a web page 405 on the display of the mobile device 400. The web page 405 includes Japanese text 410 displayed in a horizontal text orientation. In addition, the web page 405 further includes an image 412, situated under the text 410. Further, FIG. 4A depicts a scroller 415 that allows a user to navigate the web page 405 from top-to-bottom.

FIG. 4B illustrates the mobile device 400 after being right-rotated to a landscape orientation. When a user holds the mobile device 400 in the landscape orientation, the orientation detection component 305 receives event data from the mobile operating system of the change in orientation, i.e., the component 305 detects a right-rotation. The orientation detection component 305 may determine that the orientation is in a specified orientation, i.e., the landscape orientation. Further, the language detection component 310 may determine that the text 410 corresponds to a specified language, e.g., the Japanese language. As a result, the rotation component 315 rotates the text 410 in the manner depicted in FIG. 4B (e.g., by re-rendering the text on the display). That is, the Japanese text 410 is displayed in a vertical text orientation. In addition, the rotation component 315 also rotates the image 412 such that the image 412 is situated to the left of the text 410. Further, FIG. 4B depicts the scroller 415, which allows the user to navigate the web page 405 from right-to-left.

Note, in one embodiment, the detection component 305 may detect a left-rotation of the device 400, e.g., a rotation of the device 400 substantially ninety degrees to the left. In such a case, the rotation component 315 may rotate the display substantially 180 degrees and rotate the text and other content ninety degrees thereafter.

Figure 5:
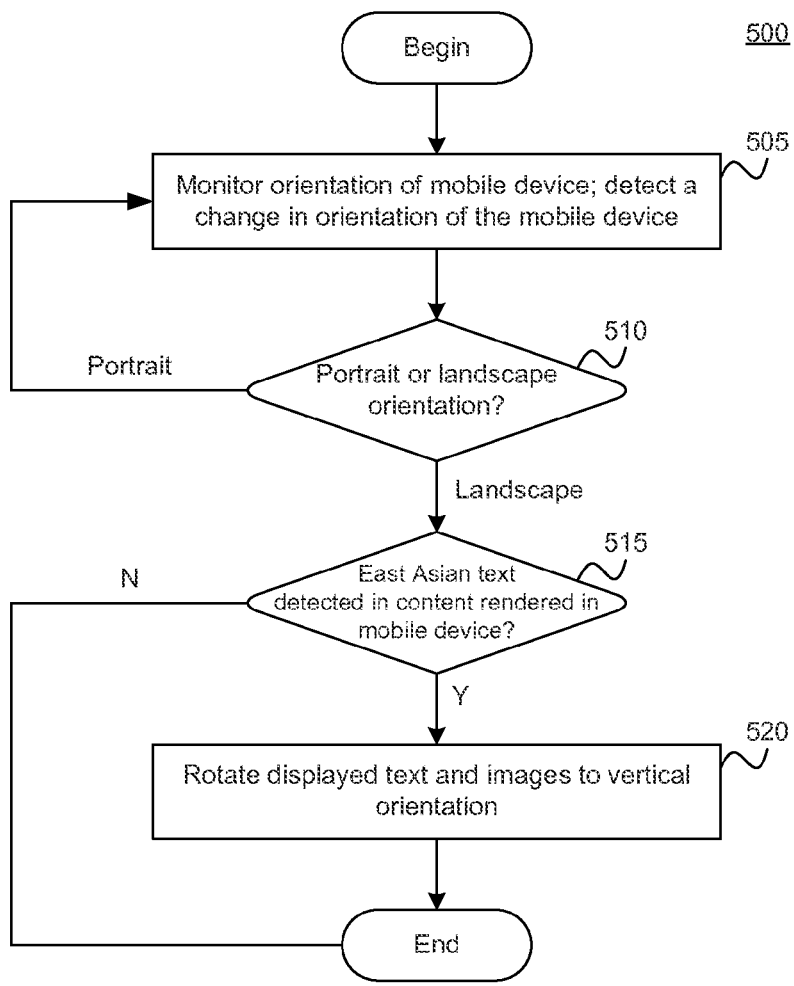
FIG. 5 illustrates a method for rotating text rendered on a mobile device display based on an orientation of the mobile device, according to one embodiment.

FIG. 5 illustrates a method for rotating text rendered on a mobile device display based on an orientation of the mobile device, according to one embodiment. Assume that the display tool 109 rotates text to have a vertical text orientation when the mobile device is in a landscape orientation and when the text content is written in Japanese. Method 500 begins at step 505, where the orientation detection component 305 determines that a change in orientation has taken place. As stated, the orientation detection component 305 may execute an event listener that receives event data from the mobile operating system indicating changes to an orientation of the mobile device.

At step 510, the orientation detection component 305 determines whether the mobile device 105 is in a portrait or landscape orientation. If in landscape orientation, then the orientation detection component 505 may notify the rotation component 315 of the change to landscape orientation. At step 515, the language detection component 310 determines whether text content displayed on the mobile device 105 is in a specified language. To do so, the language detection component 310 may perform natural language detection on the text content. If an East Asian language is detected, then the language detection component 310 notifies the rotation component 315.

At step 520, the rotation component 315 locks the display orientation. The rotation component 315 then rotates each character 90 degrees. As a result, the text is displayed in a vertical text orientation, i.e., in columns going from top-to-bottom, ordered from right-to-left. Further, the rotation component 315 rotates images included in the content such that the image is displayed upright in the vertical orientation. As another result, if a scroller is present, a user may navigate through the text from right-to-left.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to modify a layout of text content having characters rendered on a mobile device, the computer-implemented method comprising:

upon detecting the mobile device being reoriented from a first orientation to a second orientation while the mobile device is displaying characters of a first language according to the first orientation, re-rendering the display of the characters of the first language while maintaining a horizontal layout comprising a layout displayed horizontally in rows going from left-to-right and ordered from top-to-bottom, wherein the individual characters of the first language are displayed right-side-up in the first and second orientations; and upon detecting the mobile device being reoriented from the first orientation to the second orientation while the mobile device is displaying characters of a second language according to the first orientation, re-rendering the display of the characters of the second language from the horizontal layout to a vertical layout comprising a layout displayed vertically in columns going from top-to-bottom and ordered from right-to-left, wherein the individual characters of the second language are displayed right-side-up in the first and second orientations.

2. The computer-implemented method of claim 1, wherein the mobile device provides a scrolling element used to navigate the text content from top-to-bottom when displayed according to the first orientation and from right-to-left when displayed according to the second orientation.

3. The computer-implemented method of claim 1, wherein the first orientation is a portrait orientation, wherein the second orientation is a landscape orientation.

4. The computer-implemented method of claim 1, wherein the second language is an East Asian language having characters read in a format of columns going from top-to-bottom and ordered from right-to-left.

5. The computer-implemented method of claim 1, wherein the characters are determined as being written in the second language by identifying the second language from a content language field of a HyperText Transfer Protocol (HTTP) header.

6. The computer-implemented method of claim 1, wherein each of the characters is encoded in a universal character encoding scheme.

7. The computer-implemented method of claim 1, wherein the mobile device currently displays image content according to the first orientation, wherein the computer-implemented method further comprises:

re-rendering the display of the image content according to the second orientation.

8. The computer-implemented method of claim 1, wherein the first and second orientations are distinct orientations, wherein the first orientation comprises portrait orientation, wherein the second orientation comprises landscape orientation, wherein the landscape orientation has a greater display width and a lesser display height than the portrait orientation.

9. The computer-implemented method of claim 8, wherein the first and second languages are distinct languages, wherein the first language comprises a Western language, wherein the second language comprises an East Asian language.

10. The computer-implemented method of claim 9, wherein the mobile device provides a scrolling element used to navigate the text content from top-to-bottom when displayed according to the first orientation and from right-to-left when displayed according to the second orientation.

11. The computer-implemented method of claim 10, wherein the layout of the text content is modified by a display tool having a plurality of components including an orientation detection component, a language detection component, and a rotation component.

12. The computer-implemented method of claim 11, wherein each of the characters is encoded in a universal character encoding scheme, wherein each of the first and second languages is determined by identifying the respective language from a content language field of a respective HyperText Transfer Protocol (HTTP) header.

13. The computer-implemented method of claim 12, wherein the orientation detection component is configured to detect the mobile device being reoriented from the first orientation to the second orientation;
wherein the language detection component is configured to detect that the mobile device is displaying characters of the second language;
wherein the rotation component is configured to re-render the display of the characters of the second language from the horizontal layout to the vertical layout.

14. The computer-implemented method of claim 1, wherein the first and second languages are distinct languages, wherein the first language comprises a Western language, wherein the second language comprises an East Asian language.

15. The computer-implemented method of claim 1, wherein the layout of the text content is modified by a display tool having at least one of an orientation detection component, a language detection component, and a rotation component.

16. The computer-implemented method of claim 1, wherein the layout of the text content is modified by a display tool having a plurality of components.

17. The computer-implemented method of claim 16, wherein the plurality of components include an orientation detection component, a language detection component, and a rotation component.

18. The computer-implemented method of claim 17, wherein the orientation detection component is configured to detect the mobile device being reoriented from the first orientation to the second orientation.

19. The computer-implemented method of claim 17, wherein the language detection component is configured to detect that the mobile device is displaying characters of the second language.

20. The computer-implemented method of claim 17, wherein the rotation component is configured to re-render the display of the characters of the second language from the horizontal layout to the vertical layout.

* * * * *